United States Patent [19]

Ekchian et al.

[11] Patent Number: 4,624,140
[45] Date of Patent: Nov. 25, 1986

[54] LIQUID MEDIUM CAPACITIVE DISPLACEMENT SENSOR

[75] Inventors: Jack A. Ekchian, Watertown; Robert W. Hoffman, Arlington, both of Mass.; Leon Ekchian, Woodland Hills, Calif.

[73] Assignee: Optima Systems, Inc., Burlington, Mass.

[21] Appl. No.: 635,665

[22] Filed: Jul. 30, 1984

[51] Int. Cl.⁴ .............................................. G01F 23/26
[52] U.S. Cl. .................... 73/304 C; 73/653; 33/366; 33/377; 340/689
[58] Field of Search ............ 73/649, 304 C, 654; 340/685, 689, 683; 367/181; 33/366, 344, 346, 304, 303, 313, 314, 377

[56] References Cited

U.S. PATENT DOCUMENTS

| | | |
|---|---|---|
| 1,637,445 | 8/1927 | Franklin . |
| 1,864,927 | 6/1932 | Myers ........................... 220/22 X |
| 3,012,192 | 12/1961 | Lion . |
| 3,253,280 | 5/1966 | Feyling . |
| 3,464,276 | 9/1969 | Leibert . |
| 3,478,437 | 11/1969 | Cothran . |
| 3,706,225 | 12/1972 | Stimson . |
| 3,906,471 | 9/1975 | Shawhan . |
| 3,937,078 | 2/1976 | Williams . |
| 3,984,918 | 10/1976 | Chaney . |
| 4,198,760 | 4/1980 | Williams . |
| 4,254,334 | 3/1981 | Baud . |
| 4,307,516 | 12/1981 | Walker . |
| 4,332,090 | 6/1982 | Bailey et al. . |
| 4,344,235 | 8/1982 | Flanders . |
| 4,345,473 | 8/1982 | Berni . |

FOREIGN PATENT DOCUMENTS

| | | | |
|---|---|---|---|
| 716056 | 10/1931 | France | 33/366 |
| 2032110 | 4/1980 | United Kingdom | 33/366 |

*Primary Examiner*—William D. Martin, Jr.
*Attorney, Agent, or Firm*—Kenway & Jenney

[57] ABSTRACT

The inside surface of a conductive vessel (preferably spherical) with insulated adjacent segments is coated with a dielectric layer. The vessel is then partly filled with a conductive liquid-like material such as mercury having an upper surface which remains approximately horizontal irrespective of the inclination of the vessel. The capacitance between the segments and liquid varies as a function of the vessel's inclination. Vibration-induced surface action also produces varying capacitance which can be detected for seismometer applications and the like.

42 Claims, 8 Drawing Figures

1

LIQUID MEDIUM CAPACITIVE DISPLACEMENT SENSOR

BACKGROUND OF THE INVENTION

Relatively movable capacitor plates are used in a variety of displacement sensor applications in the prior art. The mechanical design of such devices does not lend itself to fabrication of small rugged low cost sensors because of the mechanical tolerances involved, for example, in the spacing between the plate elements of the capacitor. In addition, providing sufficient responsiveness and sensitivity at low cost becomes more difficult as the parts become smaller. One application in particular which has all of those requirements is downhole oil well logging where slant drilling requires an inclinometer reading. Prior devices which depend on pendulum movement are relatively inaccurate and fragile. Accelerometer-based devices have the added disadvantage of being relatively expensive.

SUMMARY OF THE INVENTION

The general purpose of the invention is to simplify the design of small rugged displacement transducers while at the same time enhancing their sensitivity and reliability. A corollary objective of the invention is to eliminate the mechanical difficulties due to the requirements for a small dielectric gap in a capacitive displacement sensor and in general to eliminate as many moving parts as possible.

These and other objects of the invention are achieved by providing a dielectric layer on the inside surface of a closed conductive vessel, preferably spherical, with segments that are insulated from each other. The vessel is then partly filled with a conductive liquid-like material, such as mercury, having an upper surface which returns to horizontal irrespective of the inclination of the vessel. The capacitance between each dielectric-coated segment and the liquid varies as a function of the vessel's inclination. Earth tremor or vibration induced surface action also produces varying capacitance which can be detected as in a seisometer or vibration detector.

DESCRIPTION OF THE PREFERRED EMBODIMENTS

Figure 1:
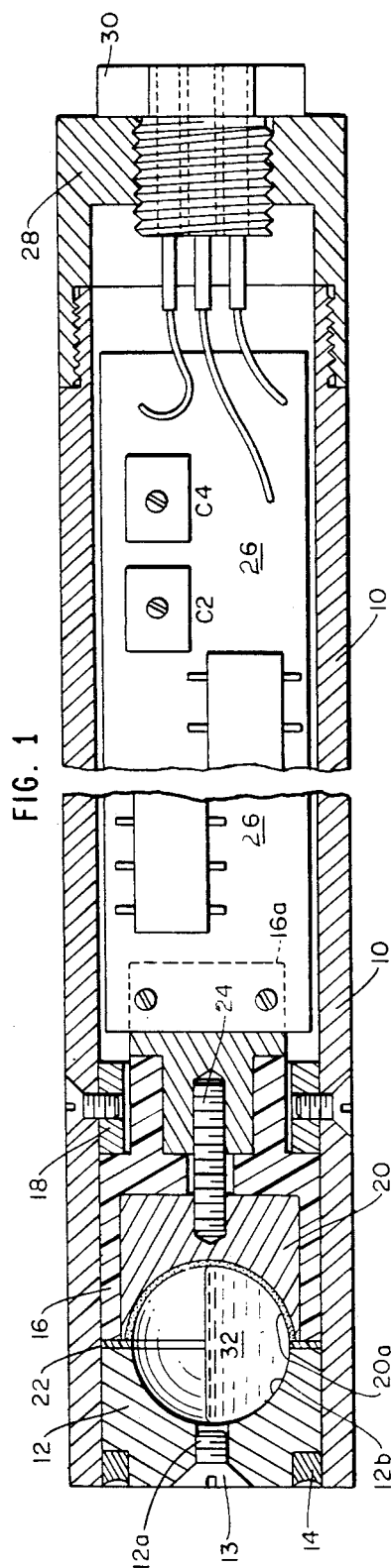
FIG. 1 is a sectional view of an inclinometer constructed to the invention.
Figure 2:
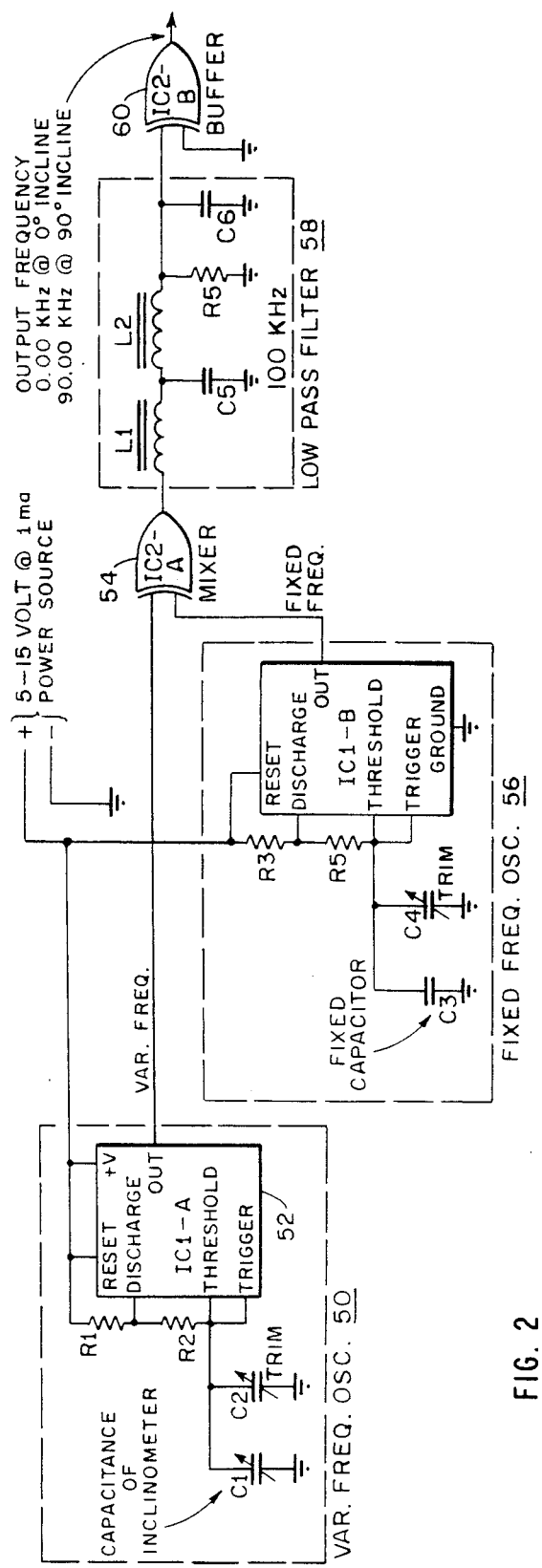
FIG. 2 is a schematic diagram of a typical electrical circuit for the electronic portion of the instrument of FIG. 1.

The liquid medium capacitive displacement sensor of the invention can be used in a variety of applications. Common to all of these applications is the relative movement of the surface of a conductive liquid-like medium partly filling a vessel composed of one or more mutually insulated, dielectric-coated conductive wall segments so as to vary the capacitance between the conductive liquid-like medium and the various insulated and dielectric-coated wall segments. One such application is as an inclinometer to measure the local tilt angle, with respect to the horizontal, of the sensor or anything to which the sensor is attached. An embodiment of an inclinometer constructed according to the invention along with associated electronics is shown in FIGS. 1 and 2. The specific embodiment shown in FIG. 1 is particularly adapted to down-hole oil well logging applications.

In FIG. 1, a brass tube 10 forms a housing for the mechanical and electronic portions of the displacement transducer. The left-hand end of the tube 10 as viewed in FIG. 1 is closed by a circular brass plug 12 secured to the inner end wall of the tube 10 by means of an annular nickel-silver brazed joint 14. The plug 12 has a central threaded bore 12a which receives flat head machine screw 16. The bore 12a forms a filling hole as explained below. The inner surface of the brass plug 12 is machined prior to assembly to provide a hemispherical cavity 12b centered on the axis of the cylindrical plug 12. In the preferred embodiment, the spherical radius is 0.250 inch. A cylindrical Teflon cup 16 is secured in place by means of a removable retaining ring 18 axially secured to the wall of tube 10 by means of a plurality of flat-head machine screws as shown. The hollow part of the cup 16 facing the end plug 12 receives a cylindrical aluminum insert 20. Insert 20 is machined prior to assembly to provide a hemispherical surface 20a. Surface 20a is coated with a dielectric which may be any nonconducting material that can be made to adhere to the surface such as plastic, ceramics, or glass. Alternatively the surface can be anodized or have another metal oxide coating. Sandwiched between the Teflon cup 16 and the end plug 12 is an insulating washer 22 preferably made of Teflon. When assembled, the spherical surface 20a of the aluminum insert 20 carried in the Teflon cup 16 is concentric with the spherical surface 12b of the end plug. Thus the end plug 12 and aluminum insert 20 from mating halves of a spherical cavity.

The aluminum insert 20 has a threaded coaxial bore which receives a threaded brass contact 24. The molded Teflon cup 16 has a mounting flange 16a to which a printed circuit board 26 is attached. The printed circuit board 26 carries the electronic components shown in FIG. 2 including adjustable trimmer capacitors C2 and C4 as shown in FIG. 1. The electrical circuitry is grounded to the tube 10 and end plug 12 while the aluminum insert 20 is insulated by the Teflon cup 16 and washer 22.

An end cap 28 is affixed to the right-hand end of the tube 10 as viewed in FIG. 1 and is equipped with a coaxial threaded bore receiving a threaded connector 30 having wires connected to the output and positive and negative power supply terminals on the printed circuit board 26. The end cap 28 can be connected to the tube 10 by means of a brazed joint or threaded fitting as shown. If desired the various openings in the tube 10 can be sealed, for example, with O-rings where necessary to form a hermetically sealed enclosure suitable for down hole applications, for example.

To make the completed instrument operational, a small amount of liquid mercury is introduced into the spherical cavity between the end plug 12 and insert 20 via the filling hole 12a. Enough mercury should be introduced so that the volume is half filled by mercury. In a preferred specific embodiment, for example, the radius of the spherical cavity is 0.25 in. Thus, approximately 0.0327 cubic inches of mercury would be necessary to half fill the volume. The screw 13 closes the filling hole and completes the spherical surface after the mercury has been added. In the preferred embodiment, the brass tube 10 is ¾ inch in outer diameter and 0.625 inch in inner diameter; the Teflon washer is 0.005 inch in thickness and the dielectric coating is 0.001 inch in thickness. The aluminum insert 20 is 0.500 inch in outer diameter. These dimensions are given only by way of illustration and will vary depending on the application.

The function of the electronics is to provide a electrical output signal which is sensitive to the varying capacitance of the sensor cell comprising the spherical cavity half filled with mercury in contact with one insulated dielectric coated hemispherical segment. A variable frequency oscillator 50 employs the capacitance between the insulated aluminum insert 20 and mercury medium 32, namely, C1, as a frequency determining component in combination with a trim capacitor C2 and threshold and discharge setting resistors R1 and R2 for a square wave oscillator circuit 52. The output of oscillator 50 is a variable frequency depending on the capacitance between the mercury and the insulated hemispherical surface of the aluminum insert 20. The output of the variable frequency oscillator 50 is mixed in mixer 54 with the fixed frequency output of a similarly implemented oscillator 56 in which the fixed capacitor C3 corresponds to variable capacitor C1 of the oscillator 50. The output of the mixer 54 is passed through a low pass filter 58 and a buffer 60 to produce an output signal which varies from 0 kHz to 90 kHz in accordance with inclination from 0° to 90°.

Trim capacitors C2 and C4 in FIGS. 1 and 2 are responsible for calibrating the frequency. Capacitor C2 is adjusted for 90.0 kHz output frequency when the inclinometer is tilted 90.00°. The trim capacitor C4 is adjusted to produce an output frequency of 0.0 kHz when the inclinometer is at 0.00°. The following table of identifying components and component values is provided for illustration only. Precise values and component selection would be expected to vary considerably depending upon the application as well as the characteristics of the inclinometer cell itself.

TABLE

| | |
|---|---|
| IC1 | Intersil ICM-7556MJD/883B |
| IC2 | Motorola MC14070BAL |
| C1 | Inclinometer cell |
| C2, C4 | Trim Cap. 5-60 micromicrofarads |
| C3 | Fixed Cap. 150 picofarads |
| R1-R4 | 10 kilohms |
| C5, C6 | .022 microfarad |
| R5 | 220 kilohms |
| L1, L2 | 100 microhenries |

In the configuration of FIG. 1, the mercury is in direct electrical contact with the grounded end plug 12. As shown in FIG. 1 where horizontal is defined arbitrarily as parallel to the axis of the tube 10, the mercury covers one-half of the dielectric surface 20a. If the instrument were tilted 90° counterclockwise so that the end plug 12 was at the bottom, the mercury would uncover substantially all of the dielectric covered hemispherical face 20a of the conductive insert 20. In this condition, the capacitance between the mercury and the insert 20 would be minimum. If the instrument of FIG. 1 were rotated 90° clockwise so that the end plug 12 was at the top of the instrument and the tube axis was vertical, the mercury would cover all of the dielectric coated face 20a of the conductive insert 20 and the capacitance C1 in FIG. 2 would be maximized. To make sure that the mercury maintains contact with the end plug in this orientation of this particular embodiment, the volume of mercury should be slightly greater than half of the volume of the spherical cavity. As the instrument is rotated from one extreme vertical orientation to the other, the capacitance will vary accordingly, enabling resolution from 0° to 180° of inclination.

The alternate embodiments of the inclinometer cell shown in FIGS. 3 and 6-8 may be substituted for the inclinometer cell formed by the end plug 12 and insert 20 of FIG. 1. These embodiments are shown only schematically. It should be understood that the lower and upper halves of the outside spherical shell shown in the embodiments of FIGS. 3 and 5 through 8 would be formed similarly to the end plug 12 and insert 20 in the embodiment of FIG. 1.

Figure 3:
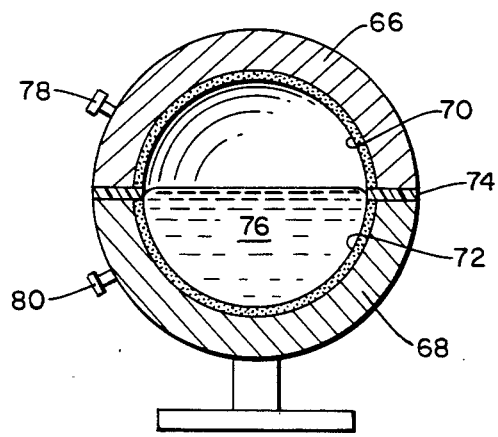
FIG. 3 is a sectional view of a liquid medium capacitive displacement sensor according to the invention.
Figure 4:
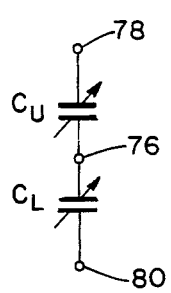
FIG. 4 is a schematic diagram of an electrical circuit equivalent to the structure of FIG. 3.
Figure 5:
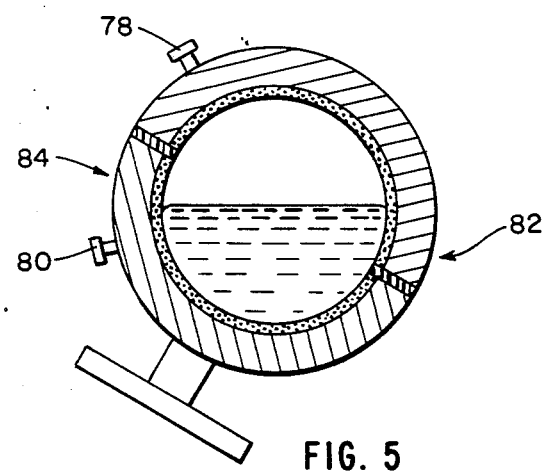
FIG. 5 is a view of the displacement sensor of FIG. 3 undergoing angular displacement.

In FIG. 3, mating insulated hemispheres 66 and 68 form a spherical cavity. The inside hemispherical surface of each element 66 and 68 is coated with a dielectric layer 70 and 72 respectively. The hemispheres are insulated from each other in a manner similar to that in FIG. 1 including an insulating washer 74. As in FIG. 1, the spherical cavity is filled slightly more than half-way with a conductive liquid-like material such as mercury. The hemispherical shells 66 and 68 are thus capacitively coupled by the conductive liquid 76. In FIG. 3, the terminal 78 on the upper shell 66 corresponds to the brass contact 24 in FIG. 1 while the other terminal 80 on the lower shell 68 corresponds to ground. The electrical circuit created between terminals 80 and 78 is diagrammed in FIG. 4. This circuit consists of two capacitors $C_U$ and $C_L$ corresponding to the upper and lower shells. $C_U$ is the capacitance defined by the upper shell 66 and the mercury 76 with the dielectric 70 in between. As shown in FIG. 5, when the inclinometer cell is tilted, the mercury covers an increasingly larger share of the upper shell's inside surface at, for example, 82 producing correspondingly increasing capacitance for the capacitor $C_U$. Conversely, more of the lower hemispherical surface is revealed at 84 producing a lower capacitance value for $C_L$. The junction between the capacitors $C_U$ and $C_L$ in FIG. 4 corresponds to the mercury 76 which is common to both capacitors. The overall capacitance between terminals 78 and 80, i.e., the upper and lower shells 66 and 68, is a function of the tilt or inclination of the device because the overall capacitance $C_O$ obeys the following relationship:

$$C_O = (C_U * C_L / (C_U + C_L))  \quad \text{Eq. 1}$$

Figure 6:
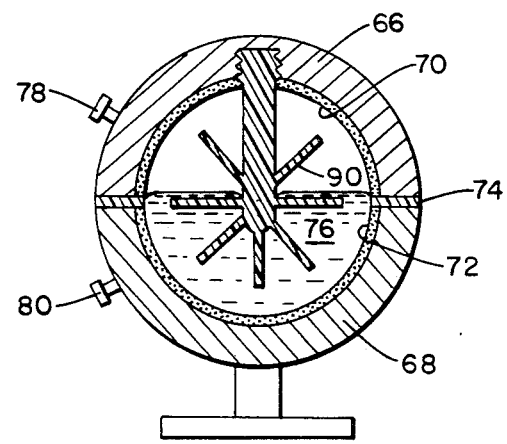
FIG. 6 is a sectional view of an alternate embodiment of the capacitive displacement sensor according to the invention having vanes for the purpose of damping the fluid motion.

The motion of the liquid-like conductive material 76 can be damped in various ways so that the response of the displacement sensor can be improved in cases where vibration or shock is present. These techniques include increasing the material's viscosity, introducing solids or viscous liquids that float on top of the material, introducing solids or liquids that mix with the material to increase the viscosity or by introducing non-conducting baffles 90 as shown in FIG. 6.

Figure 7:
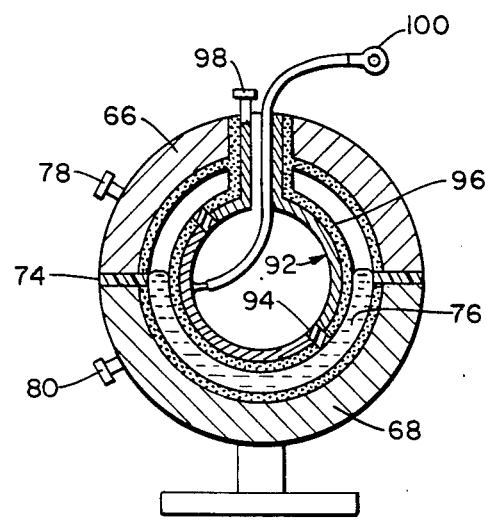
FIG. 7 is a sectional view of another embodiment of the capacitive displacement sensor according to the invention having an inner sphere.

Other shapes may also be introduced into the cavity of the device such as shown in FIG. 7 where inner sphere 92 is mounted concentrically with the spherical cavity to reduce the flow area for the liquid 76 to the spherical shell-like space between the inner and outer spheres. The smaller the spacing between this sphere and the inner walls of the outer sphere, the larger the damping of the motion of the liquid material 76. As shown in FIG. 7, the inner sphere may be similarly segmented with an insulating washer 94 and covered by a dielectric layer 96. By properly positioning the segments of the inner sphere relative to the segments of the outer sphere, the inner sphere segments can be used as a redundancy check or to give independent values of tilt or inclination in two different planes. The upper shell 66' is modified to permit electrical connection to the respective segments of the inner sphere via terminals 98 and 100. Note that terminal 100 is connected by an insulated wire to the other insulated segment of the inner sphere 92.

Figure 8:
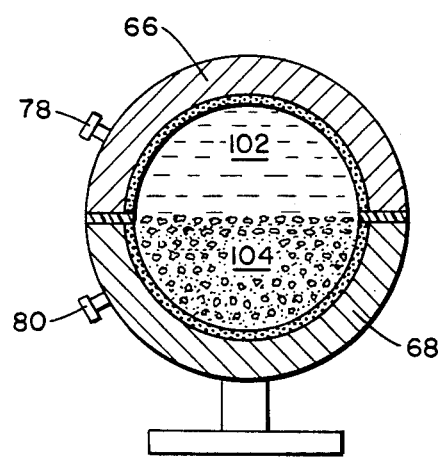
FIG. 8 is a sectional view of another embodiment of the invention containing a different liquid-like medium according to the invention.

Damping can also be accomplished by completely filling the vessel with a viscous non-conducting liquid 102 (FIG. 8) which is mixed with denser conductive particles 104. The conductive particles precipitate into a conductive mass when the displacement sensor is held stationary for a long enough period as shown in FIG. 8.

The embodiments of FIGS. 3 and 5-8 as well as the embodiment of FIG. 1 in which the cell has only one hemisphere coated with a dielectric can be used in a variety of other devices besides inclinometers. In addition to being sensitive to inclination, the cell can also be used to detect or measure vibration or sudden acceleration since its capacitance is also affected by such events. This occurs because vibration or acceleration will also cause the liquid to move with respect to the shell enclosing the spherical cavity. As a disturbance indicator, the capacitance cell is not limited to seismometer applications, but may also be useful as an intrusion detector or an auto theft detector.

The vessel can also be made of any convenient shape such as a cube, a parallelepiped or a cylinder so long as two or more mutually electrically insulated segments are utilized.

Although in the preferred embodiment the non-coated hemisphere is grounded, the electrical potential need not be at nominal ground; it may be floating at a potential above ground if desired.

The liquid-like material in the vessel can be made of any conducting material that conforms to the shape of the vessel such as a saline solution, fine metal powder, solution of metal filings in a liquid or gel, etc. Mercury is presently preferred although its relatively low viscosity must be taken into account in any application. The liquid-like medium can be any flowable material which conforms to the interior surface of the cavity and has an upper surface which remains horizontal irrespective of inclination of the vessel. In addition, all points beneath the horizontal upper surface of the liquid medium must be conductive, preferably but not necessarily uniformly conductive. Thus, instead of mercury, a slurry of conductive particles obeying the preceding requirements may suffice and may actually be preferable in a given application. Accordingly, the label "conductive liquid-like medium" used herein shall refer to materials of whatever kind whether liquid or not, meeting the foregoing requirements of flowability, conformity, horizontal surface retention and conductivity.

The advantages of the liquid medium capacitive displacement sensor according to the invention lie chiefly in its inherent simplicity and ruggedness. The absence of moving parts facilitates manufacture since close tolerances are avoided. In addition, this feature makes the capacitance cell extremely compact and practically indestructible while maintaining low cost and high sensitivity. Because the dielectric layer determines the gap between the relatively movable "plates" of the capacitor (i.e., the insulated segment and the liquid medium), the uniformity of the gap is assured simply by applying a uniform dielectric coating.

The foregoing description and illustration of the preferred embodiments, however, is provided only to illustrate various specific configurations and applications of the invention. Many modifications and variations on the illustrated embodiments may be made without departing from the spirit and scope of the invention as indicated by the appended claims.

What is claimed is:

1. A capacitive displacement sensor, comprising
   a vessel having a wall including at least two adjacent conductive wall segments,
   means for electrically insulating said wall segments from each other,
   a dielectric coating on the interior of at least one but not all of said wall segments, the interior of at least one conductive wall segment being exposed,
   a conductive liquid-like medium contained inside said vessel covering a variable part of a least one wall segment with said dielectric coating and at least one wall segment without said dielectric coating, and
   electronic means electrically connected to at least one wall segment with said coating and at least one wall segment without said coating for producing an output related to the capacitance between said liquid-like medium and said one wall segment with said dielectric coating,
   whereby displacement of said vessel causes relative movement between said vessel and said liquid-like medium and a concomitant detectable change in the capacitance between said liquid-like medium and the wall segment with the dielectric coating.

2. The sensor of claim 1, wherein said wall segments are approximately spherical.

3. The sensor of claim 1, wherein said liquid-like medium includes mercury.

4. A liquid-like medium capacitive displacement sensor, comprising
   a vessel having a wall including at least two adjacent conductive wall segments,
   means for electrically insulating said wall segments from each other,
   a dielectric coating on the interior of at least one of said wall segments,
   a conductive liquid-like medium contained inside said vessel covering a variable part of at least one wall segment with said dielectric coating,
   means inside said vessel and in communication with said liquid-like medium for damping the motion of said liquid-like medium, and
   electronic means for producing an output related to the capacitance between said liquid-like medium and said one wall segment, whereby displacement of said vessel causes relative movement between said vessel and said liquid-like medium and a concomitant detectable change in the capacitance between said liquid-like medium and the wall segment with the dielectric coating.

5. The sensor of claim 4, wherein said damping means includes non-conductive baffles mounted on the inside of said vessel and extending into said liquid-like medium.

6. The sensor of claim 4, wherein said damping means includes a non-conductive material of lower density floating on top of said liquid-like medium.

7. The sensor of claim 4, wherein said damping means includes means added to said liquid-like medium for making it more viscous.

8. The sensor of claim 4, wherein said damping means is a body inside the vessel immersed in said liquid-like medium.

9. A liquid-like medium capacitive displacement sensor, comprising
a vessel having a wall including at least two adjacent conductive wall segments,
means for electrically insulating said wall segments from each other,
a dielectric coating on the interior of at least one of said wall segments,
a conductive liquid-like medium contained inside said vessel covering a variable part of at least one wall segment with said dielectric coating, said liquid-like medium including flowable conductive particulate material, and
electronic means for producing an output related to the capacitance between said liquid-like medium and said one wall segment,
whereby displacement of said vessel causes relative movement between said vessel and said liquid-like medium and a concomitant detectable change in the capacitance between said liquid-like medium and the wall segment with the dielectric coating.

10. A liquid-like medium capacitive displacement sensor, comprising
a vessel having a wall including at least two adjacent conductive wall segments,
means for electrically insulating said wall segments from each other,
a dielectric coating on the interior of at least one of said wall segments,
a conductive liquid-like medium contained inside said vessel covering a variable part of at least one wall segment with said dielectric coating, said liquid-like medium including a slurry including conductive particulate material, and
electronic means for producing an output related to the capacitance between said liquid-like medium and said one wall segment,
whereby displacement of said vessel causes relative movement between said vessel and said liquid-like medium and a concomitant detectable change in the capacitance between said liquid-like medium and the wall segment with the dielectric coating.

11. A liquid-like medium capacitive displacement sensor, comprising
a vessel having a wall including at least two adjacent conductive wall segments,
means for electrically insulating said wall segments from each other,
a dielectric coating on the interior of at least one of said wall segments,
a conductive liquid-like medium contained inside said vessel covering a variable part of at least one wall segment with said dielectric coating,
said vessel being substantially completely filled with a non-conducting liquid mixed with a denser conductive material which precipitates to form said liquid-like medium when the vessel is held stationary, and
electronic means for producing an output related to the capacitance between said liquid-like medium and said one wall segment,
whereby displacement of said vessel causes relative movement between said vessel and said liquid-like medium and a concomitant detectable change in the capacitance between said liquid-like medium and the wall segment with the dielectric coating.

12. The sensor of claim 1, wherein said vessel defines a spherical cavity.

13. The sensor of claim 12, wherein said one wall segment with said dielectric coating is a hemispherical segment, and
said liquid-like medium fills approximately half of the spherical volume.

14. The sensor of claim 13, wherein said electronic means includes a capacitor controlled oscillator in which the control capacitance is the capacitance between the liquid-like medium and said one wall segment.

15. The sensor of claim 14, wherein said electronic means further includes a fixed frequency oscillator, and
mixer means for mixing the outputs of said variable and fixed frequency oscillators.

16. The sensor of claim 15, wherein said electronic means further includes low pass filter means for filtering the output of said mixer means to produce a frequency output indicative of the relative inclination of said vessel.

17. The sensor of claim 16, wherein said electronic means further comprises capacitive means for adjusting the frequencies of said variable and fixed frequency oscillators to calibrate the frequency output of said low pass filter means.

18. The sensor of claim 12, further comprising
a concentric spherical body mounted inside said vessel.

19. The sensor of claim 18, wherein said spherical body includes at least two insulated conductive wall segments, at least one of said wall segments having a dielectric coating, and insulated lead means extending through said vessel for providing electrical connections to said wall segments of said spherical body.

20. An inclinometer comprising
a vessel having a wall including at least two adjacent conductive wall segments,
means for electrically insulating said wall segments from each other,
a dielectric coating on the interior of at least one but not all of said wall segments, the interior of at least one conductive wall segment being exposed,
a conductive liquid-like medium contained inside said vessel covering a variable part of at least one wall segment with said dielectric coating and at least one wall segment without said dielectric coating, and
electronic means electrically connected to at least one wall segment with said coating and at least one wall segment without said coating for producing an output related to the capacitance between said liquid-like medium and said one wall segment with said dielectric coating, whereby displacement of said vessel causes relative movement between said vessel and said liquid-like medium and a concomitant detectable change in the capacitance between said liquid-like medium and the wall segment with the dielectric coating.

21. The inclinometer of claim 20, wherein said wall segments are approximately spherical.

22. The inclinometer of claim 20, wherein said liquid-like medium includes mercury.

23. An inclinometer comprising a vessel having a wall including at least two adjacent conductive wall segments, means for electrically insulating said wall segments from each other, a dielectric coating on the interior of at least one of said wall segments, a conductive liquid-like medium contained inside said vessel covering a variable part of at least one wall segment with said dielectric coating, means inside said vessel and in communication with said liquid-like medium for damping the motion of said liquid-like medium, and electronic means for producing an output related to the capacitance between said liquid-like medium and said one wall segment, whereby displacement of said vessel causes relative movement between said vessel and said liquid-like medium and a concomitant detectable change in the capacitance between said liquid-like medium and the wall segment with the dielectric coating.

24. A seismometer comprising a vessel having a wall including at least two adjacent conductive wall segments, means for electrically insulating said wall segments from each other, a dielectric coating on the interior of at least one but not all of said segments, the interior of at least one conductive wall segment being exposed, a conductive liquid-like medium contained inside said vessel covering a variable part of at least one wall segment with said dielectric coating and at least one wall segment without said dielectric coating, and electronic means electrically connected to at least one wall segment with said coating and at least one wall segment without said coating for producing an output related to the capacitance between said liquid-like medium and said one wall segment with said dielectric coating, whereby displacement of said vessel causes relative movement between said vessel and said liquid-like medium and a concomitant detectable change in the capacitance between said liquid-like medium and the wall segment with the dielectric coating.

25. The seismometer of claim 24, wherein said wall segments are approximately spherical.

26. The seismometer of claim 24, wherein said liquid-like medium includes mercury.

27. A seismometer comprising a vessel having a wall including at least two adjacent conductive wall segments, means for electrically insulating said wall segments from each other, a dielectric coating on the interior of at least one of said wall segments, a conductive liquid-like medium contained inside said vessel covering a variable part of at least one wall segment with said dielectric coating, means inside said vessel and in communication with said liquid-like medium for damping the motion of said liquid-like medium, and electronic means for producing an output related to the capacitance between said liquid-like medium and said one wall segment, whereby displacement of said vessel causes relative movement between said vessel and said liquid-like medium and a concomitant detectable change in the capacitance between said liquid-like medium and the wall segment with the dielectric coating.

28. A capacitive displacement cell, comprising a tubular housing, an electrically conductive end plug received in one end of said tubular housing, said end plug having an inside face transverse to the tubular axis, the inside face of said end plug having a spherical recess centered on said tubular axis, nonconductive cup means received in said tubular housing having a recess opposite said hemispherical recess in said end plug, a conductive insert received in said cup means recess, said insert having an opposed hemispherical recess concentric with said hemispherical recess in said end plug so as to form therewith a spherical cavity, a nonconductive washer means between the inside face of said end plug and said cup means with said insert for insulating said conductive insert from said conductive end plug, an electrical terminal contacting said conductive insert and extending through said nonconducting cup means, a uniform dielectric coating on the hemispherical recess of said conductive insert, and means for introducing a liquid medium into said spherical cavity.

29. The cell of claim 28, wherein said liquid medium introducing means includes a closeable port defined through said end plug communicating with said spherical cavity.

30. The cell of claim 29, further comprising a coaxial retaining ring, a coaxial annular recess defined around the circumference of said cup means receiving said retaining ring, and means for detachably affixing said retaining ring to the inside wall of said housing.

31. The cell of claim 28, further comprising electronic means in said housing connected to said electrical terminal and to said end plug for producing an output signal related to the capacitance between said liquid medium and said conductive insert.

32. The cell of claim 31, further comprising removable cap means closing the other end of said tubular housing, and p1 electrical connector means extending through said cap means electrically connected to said electronic means for making the output of said electrical means externally available.

33. The cell of claim 28, wherein said housing is electrically conductive, and further comprising means for electrically and mechanically affixing the end plug to the tubular housing.

34. A capacitive displacement sensor, comprising a vessel having a wall including at least two conductive wall segments, means for electrically insulating said wall segments from each other, a dielectric coating on the interior of said vessel covering said two wall segments, a conductive flowable material contained inside said vessel covering a variable part of said two wall segments, electrical terminal means connected to said two conductive wall segments respectively, and electronic means connected to said two terminals for producing an output related to the series capacitance between said flowable material and one wall segment and said flowable material and said other wall segment, whereby displacement of said vessel causes relative movement between said vessel and said flowable material and a concomitant detectable change in the series capacitance between the flowable material and the dielectric coated wall segments.

35. The sensor of claim 34, wherein said wall segments are approximately spherical.

36. The sensor of claim 35, wherein said wall segments define a closed spherical cavity.

37. The sensor of claim 34, wherein said flowable material is mercury.

38. The sensor of claim 34, further comprising means inside said vessel and in communication with said flowable material for damping the motion of said flowable material.

39. The sensor of claim 38, wherein said flowable material includes mercury.

40. A capacitive displacement sensor, comprising a vessel having a wall defining a spherical cavity composed of two mating hemispherical electrically conductive wall segments, means for electrically insulating said wall segments from each other, a dielectric coating of uniform thickness over the entire hemispherical interior surface of one of said wall segments, a conductive flowable material filling approximately half the volume of said spherical cavity contained inside said vessel, means electrically connected to said wall segments for producing an output related to the capacitance between said flowable material and said one wall segment with said dielectric coating, whereby displacement of said vessel causes relative movement between said vessel and said flowable material and concomitant change in the variable part of the dielectric coated wall segment covered by said flowable material thus changing the capacitance therebetween, the other wall segment acting as an electrode in contact with said conductive flowable material.

41. The sensor of claim 40, wherein said flowable material is mercury.

42. The sensor of claim 40, further comprising means inside said vessel and in communication with said flowable material for damping the motion of said flowable material.

* * * * *

UNITED STATES PATENT AND TRADEMARK OFFICE
CERTIFICATE OF CORRECTION

PATENT NO. : 4,624,140

DATED : November 25, 1986

INVENTOR(S) : Jack A. Ekchian, Robert W. Hoffman and Leon Ekchian

It is certified that error appears in the above-identified patent and that said Letters Patent is hereby corrected as shown below:

Column 10, line 58, "housing, and pl electrical connector means extending" should be --housing, and electrical connector means extending--.

Signed and Sealed this

Tenth Day of February, 1987

Attest:

DONALD J. QUIGG

Attesting Officer

Commissioner of Patents and Trademarks

(12) REEXAMINATION CERTIFICATE (4258th)
United States Patent
Ekchian et al.

(10) Number: US 4,624,140 C1
(45) Certificate Issued: Jan. 30, 2001

(54) LIQUID MEDIUM CAPACITIVE DISPLACEMENT SENSOR

(75) Inventors: Jack A. Ekchian, 116 Watson Rd., Belmont, MA (US) 02178; Robert W. Hoffman, Arlington, MA (US); Leon Ekchian, Woodland Hills, CA (US)

(73) Assignee: Jack A. Ekchian, Belmont, MA (US)

Reexamination Requests:
No. 90/004,635, May 15, 1997
No. 90/005,315, Apr. 6, 1999
No. 90/005,504, Sep. 24, 1999

Reexamination Certificate for:
Patent No.: 4,624,140
Issued: Nov. 25, 1986
Appl. No.: 06/635,665
Filed: Jul. 30, 1984

Certificate of Correction issued Feb. 10, 1987.

(51) Int. Cl.[7] ............................. G01F 23/26; G01L 9/20
(52) U.S. Cl. ................................ 73/304 C; 33/366.19
(58) Field of Search .................... 73/304 C, 649, 73/658; 33/366.11, 366.18, 366.19, 366.25, 344, 346, 313, 377, 304; 340/689

(56) References Cited

U.S. PATENT DOCUMENTS

| | | |
|---|---|---|
| 1,637,445 | 8/1927 | Franklin . |
| 1,864,927 | 6/1932 | Myers . |
| 2,919,579 * | 1/1960 | Gronner ........................ 73/304 C |
| 2,936,411 | 5/1960 | Doty ............................... 317/246 |
| 3,012,192 | 12/1961 | Lion ............................... 324/57 |
| 3,253,280 | 5/1966 | Feyling ........................... 346/108 |
| 3,337,789 | 8/1967 | Ono et al. ....................... 321/24 |
| 3,464,276 | 9/1969 | Leibert ............................ 73/516 |
| 3,478,437 | 11/1969 | Cothran .......................... 33/206 |
| 3,706,225 | 12/1972 | Stimson ........................... 73/189 |
| 3,906,471 | 9/1975 | Shawhan ......................... 340/200 |
| 3,937,078 | 2/1976 | Williams ......................... 73/189 |
| 3,984,918 * | 10/1976 | Chaney ........................... 33/366.18 |
| 4,028,815 * | 6/1977 | Buckley et al. ................. 33/366.21 |
| 4,198,760 | 4/1980 | Williams ......................... 33/311 |
| 4,254,334 | 3/1981 | Baud .............................. 250/231 |
| 4,307,516 | 12/1981 | Walker ........................... 33/366 |
| 4,332,090 | 6/1982 | Bailey et al. .................. 33/366 |
| 4,344,235 | 8/1982 | Flanders ......................... 33/366 |
| 4,345,473 | 8/1982 | Berni ............................. 73/516 |
| 4,521,973 | 6/1985 | Wiklund et al. ................ 33/366 |

FOREIGN PATENT DOCUMENTS

| | | | |
|---|---|---|---|
| 716056 | 12/1931 | (FR) | ............................. 33/366 |
| 2032110 | 4/1980 | (GB) | ............................. 33/366 |
| 10414 | 6/1967 | (JP) . | |
| 1063990 | 12/1983 | (RU) . | |

* cited by examiner

*Primary Examiner*—Andrew Hirshfeld

(57) ABSTRACT

The inside surface of a conductive vessel (preferably spherical) with insulated adjacent segments is coated with a dielectric layer. The vessel is then partly filled with a conductive liquid-like material such as mercury having an upper surface which remains approximately horizontal irrespective of the inclination of the vessel. The capacitance between the segments and liquid varies as a function of the vessel's inclination. Vibration-induced surface action also produces varying capacitance which can be detected for seismometer applications and the like.

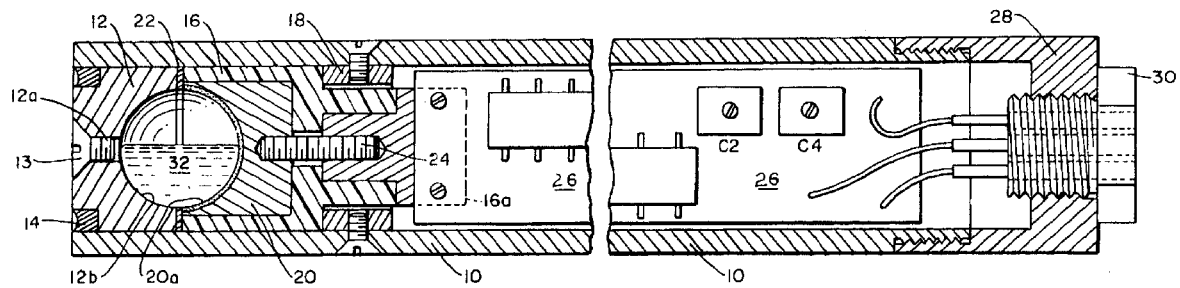

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 4–8 and 20–39 is confirmed.

Claims 1, 9–11 and 40 are determined to be patentable as amended.

Claims 2, 3, 12–19, 41 and 42, dependent on an amended claim, are determined to be patentable.

New claims 43–47 are added and determined to be patentable.

1. A capacitive displacement sensor, comprising *a housing containing*
a vessel having a wall including at least two adjacent conductive wall segments,
means for electrically insulating said wall segments from each other,
a dielectric coating on the interior of at least one but not all of said wall segments, the interior of at least one conductive wall segment being exposed,
a conductive liquid-like medium contained inside said vessel covering a variable part of a least one wall segment with said dielectric coating and at least one wall segment without said dielectric coating, and
electronic means electrically connected to at least one wall segment with said coating and at least one wall segment without said coating for producing an output related to the capacitance between said liquid-like medium and said one wall segment with said dielectric coating,
whereby displacement of said vessel causes relative movement between said vessel and said liquid-like medium and a concomitant detectable change in the capacitance between said liquid-like medium and the wall segment with the dielectric coating, *said sensor having no moving parts that would allow relative movement between said vessel and said housing.*

9. A liquid-like medium capacitive displacement sensor, comprising *a housing containing*
a vessel having a wall including at least two adjacent conductive wall segments,
means for electrically insulating said wall segments from each other,
a dielectric coating on the interior of at least one of said wall segments,
a conductive liquid-like medium contained inside said vessel covering a variable part of at least one wall segment with said dielectric coating, said liquid-like medium including flowable conductive particulate material, and
electronic means for producing an output related to the capacitance between said liquid-like medium and said one wall segment,
whereby displacement of said vessel causes relative movement between said vessel and said liquid-like medium and a concomitant detectable change in the capacitance between said liquid-like medium and the wall segment with the dielectric coating, *said sensor having no moving parts that would allow relative movement between said vessel and said housing.*

10. A liquid-like medium capacitive displacement sensor, comprising *a housing containing*
a vessel having a wall including at least two adjacent conductive wall segments,
means for electrically insulating said wall segments from each other,
a dielectric coating on the interior of at least one of said wall segments,
a conductive liquid-like medium contained inside said vessel covering a variable part of at least one wall segment with said dielectric coating, said liquid-like medium including a slurry including conductive particulate material, and
electronic means for producing an output related to the capacitance between said liquid-like medium and said one wall segment,
whereby displacement of said vessel causes relative movement between said vessel and said liquid-like medium and a concomitant detectable change in the capacitance between said liquid-like medium and the wall segment with the dielectric coating, *said sensor having no moving parts that would allow relative movement between said vessel and said housing.*

11. A liquid-like medium capacitive displacement sensor, comprising *a housing containing*
a vessel having a wall including at least two adjacent conductive wall segments,
means for electrically insulating said wall segments from each other,
a dielectric coating on the interior of at least one of said wall segments,
a conductive liquid-like medium contained inside said vessel covering a variable part of at least one wall segment with said dielectric coating,
said vessel being substantially completely filled with a non-conducting liquid mixed with a denser conductive material which precipitates to form said liquid-like medium when the vessel is held stationary, and
electronic means for producing an output related to the capacitance between said liquid-like medium and said one wall segment,
whereby displacement of said vessel causes relative movement between said vessel and said liquid-like medium and a concomitant detectable change in the capacitance between said liquid-like medium and the wall segment with the dielectric coating, *said sensor having no moving parts that would allow relative movement between said vessel and said housing.*

40. A capacitive displacement sensor, comprising *a housing containing*
a vessel having a wall defining a spherical cavity composed of two mating hemispherical electrically conductive wall segments,
means for electrically insulating said wall segments from each other,
a dielectric coating of uniform thickness over the entire hemispherical interior surface of one of said wall segments, a conductive flowable material filling approximately half the volume of said spherical cavity contained inside said vessel, means electrically connected to said wall segments for producing an output related to the capacitance between said flowable material and said one wall segment with said dielectric coating, whereby displacement of said vessel causes relative movement between said vessel and said flowable material and concomitant change in the variable part of the dielectric coated wall segment covered by said flowable material thus changing the capacitance therebetween, the other wall segment acting as an electrode in contact with said conductive flowable material, *said sensor having no moving parts that would allow relative movement between said vessel and said housing.*

43. *A capacitive displacement sensor, comprising*

*a vessel defining a spherical cavity having a wall including at least two adjacent conductive wall segments, said sensor further comprising a concentric spherical body mounted inside said vessel,*

*means for electrically insulating said wall segments from each other,*

*a dielectric coating on the interior of at least one but not all of said wall segments, the interior of at least one conductive wall segment being exposed,*

*a conductive liquid-like medium contained inside said vessel covering a variable part of at least one wall segment with said dielectric coating and at least one wall segment without said dielectric coating, and*

*electronic means electrically connected to at least one wall segment with said coating and at least one wall segment without said coating for producing an output related to the capacitance between said liquid-like medium and said one wall segment with said dielectric coating,*

*whereby displacement of said vessel causes relative movement between said vessel and said liquid-like medium and a concomitant detectable change in the capacitance between said liquid-like medium and the wall segment with the dielectric coating.*

44. *The sensor of claim 43, wherein said spherical body includes at least two insulated conductive wall segments, at least one of said wall segments having a dielectric coating, and insulated lead means extending through said vessel for providing electrical connections to said wall segments of said spherical body.*

45. *A capacitive displacement sensor, comprising*

*a vessel defining a spherical cavity having a wall including at least two adjacent conductive wall segments,*

*means for electrically insulating said wall segments from each other,*

*a dielectric coating on the interior of at least one but not all of said wall segments, the interior of at least one conductive wall segment being exposed, said one wall segment with said dielectric coating being a hemispherical segment,*

*a conductive liquid-like medium contained in the spherical cavity of said vessel covering a variable part of at least one wall segment with said dielectric coating and at least one wall segment without said dielectric coating and filling approximately half of the spherical volume,*

*electronic means electrically connected to at least one wall segment with said coating and at least one wall segment without said coating for producing an output related to the capacitance between said liquid-like medium and said one wall segment with said dielectric coating, said electronic means including a capacitor controlled oscillator in which the control capacitance is the capacitance between the liquid-like medium and said one wall segment with said dielectric coating, said electronic means further including a fixed frequency oscillator, and mixer means for mixing the outputs of said variable and fixed frequency oscillators,*

*whereby displacment of said vessel causes relative movement between said vessel and said liquid-like medium and a concomitant detectable change in the capacitance between said liquid-like medium and the wall segment with the dielectric coating.*

46. *The sensor of claim 45, wherein said electronic means further includes low pass filter means for filtering the output of said mixer means to produce a frequency output indicative of the relative inclination of said vessel.*

47. *The sensor of claim 46, wherein said electronic means further comprises capacitive means for adjusting the frequencies of said variable and fixed frequency oscillators to calibrate the frequency output of said low pass filter means.*

\* \* \* \* \*